(12) United States Patent
Sameshima

(10) Patent No.: US 6,834,374 B1
(45) Date of Patent: Dec. 21, 2004

(54) AUDIO-VIDEO CONTROL SYSTEM

(75) Inventor: Tetsuro Sameshima, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/472,835

(22) Filed: Dec. 28, 1999

(30) Foreign Application Priority Data

Dec. 28, 1998 (JP) .......................................... 10-374418

(51) Int. Cl.⁷ .............................................. G09G 5/00
(52) U.S. Cl. .................... 715/736; 715/734; 715/735
(58) Field of Search .......................... 725/725, 37, 38, 725/39, 52, 61; 345/716, 717, 718–727, 764, 810, 835, 840, 723, 734, 735, 736, 738; 707/513; 709/218

(56) References Cited

U.S. PATENT DOCUMENTS

| | | | | |
|---|---|---|---|---|
| 5,657,221 A | * | 8/1997 | Warman et al. ............... | 700/83 |
| 5,781,228 A | * | 7/1998 | Sposato ....................... | 348/13 |
| 5,959,678 A | * | 9/1999 | Callahan et al. ............. | 348/442 |
| 6,055,560 A | * | 4/2000 | Mills et al. .................. | 709/200 |
| 6,182,094 B1 | * | 1/2001 | Humpleman et al. ........ | 707/513 |
| 6,425,128 B1 | * | 7/2002 | Krapf et al. .................. | 725/37 |
| 2002/0109710 A1 | * | 8/2002 | Holtz et al. .................. | 345/723 |

FOREIGN PATENT DOCUMENTS

| | | |
|---|---|---|
| JP | 08-079847 | 3/1996 |
| JP | 10-234088 | 9/1998 |

* cited by examiner

*Primary Examiner*—Ba Huynh
*Assistant Examiner*—Mylinh Tran
(74) *Attorney, Agent, or Firm*—Westerman, Hattori, Daniels & Adrian LLP

(57) ABSTRACT

An AV control system comprises a controller 1 having a plurality of devices connected thereto, remote control ports 15 for outputting control signals, input ports 11, 12 for receiving AV signals, and output ports 13, 14 for outputting AV signals. The controller 1 has a connection table prescribing connection relations between the ports and the devices, and displays the connection relations on a screen of a touch panel input unit 2. When the connection relation is modified by manipulating the input unit 2, the connection table is rewritten based on the result of modification, whereby the device is connectable to the controller 1 with greater ease than in the prior art.

5 Claims, 21 Drawing Sheets

FIG. 10

| BUTTON CODE | DEVICE NAME |
| --- | --- |
| 1 | S/VCR |
| 2 | — |
| 3 | — |
| 4 | — |
| 5 | DVD1 |
| 6 | VCR1 |
| 7 | CD |
| 8 | AMP2 |
| 9 | VCR2 |
| 10 | Proj |

FIG. 11

| BUTTON CODE | DEVICE NAME |
| --- | --- |
| 1 | S/VCR |
| 2 | — |
| 3 | — |
| 4 | — |
| 5 | DVD1 |
| 6 | VCR1 |
| 7 | LDP2 |
| 8 | AMP2 |
| 9 | VCR2 |
| 10 | Proj |

FIG. 12

| ORDER CODE | DEVICE NAME |
|---|---|
| 1 | AMP |
| 2 | TV |
| 3 | DVD2 |
| 4 | DVD3 |
| 5 | CD2 |
| 6 | LDP1 |
| 7 | LDP2 |
| 8 | LDP3 |
| 9 | Proj |
| 10 | DVD1 |
| 11 | VCR1 |
| 12 | VCR2 |
| 13 | VCR3 |
| 14 | AMP2 |
| 15 | CD |
| 16 | S/VCR |

FIG. 20

| BUTTON CODE | DEVICE NAME |
|---|---|
| 1 | VCR2 |
| 2 | VCR1 |
| 3 | DVD1 |
| 4 | — |
| 5 | — |
| 6 | — |
| 7 | — |
| 8 | — |

FIG. 21

| BUTTON CODE | DEVICE NAME |
|---|---|
| 9 | VCR2 |
| 10 | VCR1 |
| 11 | DVD1 |
| 12 | CD |
| 13 | — |
| 14 | — |
| 15 | — |
| 16 | — |

FIG. 22

| BUTTON CODE | DEVICE NAME |
|---|---|
| 9 | VCR2 |
| 10 | VCR1 |
| 11 | S/VCR |
| 12 | CD |
| 13 | —— |
| 14 | —— |
| 15 | —— |
| 16 | —— |

AUDIO-VIDEO CONTROL SYSTEM

FIELD OF THE INVENTION

The present invention relates to audio-video control systems (hereinafter referred to as "AV control systems") which comprise a controller connected to a plurality of devices including audio-video devices (hereinafter referred to as "AV devices") and having an input unit, which is manipulated to control the operation of the plurality of devices.

BACKGROUND OF THE INVENTION

Already proposed is an AV control system as shown in FIG. 30 and comprising a host computer 40 connected via a device control unit 20 to a group 30 of devices such as a DVD player 31, VCR 32, LD player 33, CD player 34, TV receiver 35 and AV amplifier 37. The host computer 40 has an input-output unit, i.e., a keyboard 42, and a display 43, which are used for collectively operating the group 30 of AV devices.

The desired AV device can be caused to operate using the AV control system by manipulating the keyboard 42 to select the desired AV device on a device selection frame projected on the display 43, and further selectively manipulating required keys on a frame showing a plurality of operating keys for the selected device.

The device control unit 20 has output ports having connected thereto the signal output devices, such as VCR, among the AV devices, input ports having connected thereto signal input devices such as AV amplifier, and control ports for delivering control signals to the devices. Each specified device is connected to such ports as predetermined.

The AV control system is so adapted that when the user manipulates one contents select button among a plurality of contents select buttons which are shown on the display 43 for realizing the predetermined operations (contents) of one or more of the AV devices, the operation corresponding to the manipulated button can be performed.

For example, when "VCR-1" button is manipulated, the control unit 20 controls the devices concerned using control ports and switches the connection relation between output ports and input ports for the execution of the following operations in sequence.

(S1) Turning on the power supply of VCR-1.

(S2) Setting VCR-1 for use as the sound input source.

(S3) Setting light 1 (illumination of the room) at a brightness of 20%.

(S4) Setting VCR-1 as the video input source.

(S5) Setting the liquid-crystal projector in video mute state.

(S6) Setting VCR-1 in condition for PLAY.

(S7) Bringing the liquid-crystal projector out of the video mute state.

(S8) Switching the input signal of the liquid-crystal projector to "video 1."

With the conventional AV control system, however, the connection relations between the ports prepared for the device control unit 20 and the devices are prescribed, and it is necessary to connect the control terminals of specified devices to the control ports, and the input terminals and output terminals of the specified devices to the respective output ports and input ports according to the prescription. The system has the problem that this connection work is very complex.

SUMMARY OF THE INVENTION

An object of the present invention is to provide an AV control system which is connectable to devices with greater ease than conventionally.

The present invention provides an AV control system which comprises a controller for controlling a plurality of devices including AV devices, the controller comprising:

a plurality of control ports for outputting control signals to the plurality of devices, connection table storing means having stored therein a connection table prescribing connection relations between the control ports and the devices, means for prescribing the control port for feeding the control signal to each device with reference to the connection table stored in the table storing means, means for displaying the connection relations between the control ports and the devices on an image display screen with reference to the connection table stored in the table storing means, means for modifying the connection relation displayed on the screen in accordance with manipulation of an input unit; and means for rewriting the connection table based on the result of the modification.

With the AV control system of the present invention, each device can be freely connected to the desired one of the control ports of the controller.

The connection relations between the control ports and the devices are thereafter displayed on the image display screen with reference to the connection table stored in the connection table storing means. The table storing means has stored therein the initial values or previous values of the table indicating the connection relations between the control ports and the devices, and these relations are to be displayed by the relation displaying means with reference to the table. In the case where the connection of one of the devices to the control port is subsequently changed, the connection relation concerned and displayed differs from the actual one.

Accordingly, the input unit is manipulated to modify the displayed connection relation to the actual connection relation. This modification can be performed easily on the screen while visually recognizing the actual connection relation.

Based on the modified connection relation, the connection table is thereafter automatically rewritten to represent the actual state of connections.

Consequently, the port prescribing means defines the control port for feeding a control signal to each device so as to feed the control signal to the control port having the intended device connected thereto and to control the device.

Specifically stated, the connection relation modifying means comprises:

device name storing means having stored therein the names of a plurality of devices connectable to the controller, means for displaying the device names stored in the name storing means on the screen in accordance with manipulation of the input unit, and device name changing means for selecting one of the connection relations displayed on the screen and changing the name of the device involved in the selected connection relation for the device name as selected from the device names displayed on the screen upon the selection of the device name.

With this specific construction, one of the connection relations displayed is selected and one of the device names displayed is selected by manipulating the input device. The name of the device involved in the selected connection relation can be changed for the selected device name merely by this procedure, whereby the connection table can be rewritten easily.

The present invention further provides an AV control system which comprises a controller for controlling a plurality of devices including AV devices, the controller comprising:

- input ports to be connected to signal output devices included in the plurality of devices,
- output ports to be connected to signal input devices included in the plurality of devices for receiving signals from the signal output devices,
- connection table storing means having stored therein a connection table prescribing connection relations between the ports and the devices,
- port prescribing means prescribing the input port for receiving the signal from each signal output device and prescribing the output port for feeding a signal to each signal input device, with reference to the connection table stored in the table storing means,
- means for displaying the connection relations between the ports and the devices on an image display screen with reference to the connection table stored in the table storing means,
- means for modifying the connection relation displayed on the screen in accordance with manipulation of an input unit; and
- means for rewriting the connection table based on the result of the modification.

With the AV control system of the present invention, each signal output device can be freely connected to the desired one of the input ports of the controller, and each signal input device to the desired one of the output ports of the controller.

The connection relations between the ports and the devices are thereafter displayed on the image display screen with reference to the connection table stored in the connection table storing means. The table storing means has stored therein the initial values or previous values of the table indicating the connection relations between the ports and the devices, and these relations are to be displayed by the relation displaying means with reference to the table. In the case where the connection of one of the devices to the input or output port is subsequently changed, the connection relation concerned and displayed differs from the actual one.

Accordingly, the input unit is manipulated to modify the displayed connection relation to the actual connection relation. This modification can be performed easily on the screen while visually recognizing the actual connection relation.

Based on the modified connection relation, the connection table is thereafter automatically rewritten to represent the actual state of connections.

Consequently, the port prescribing means defines the input port for receiving a signal from each signal output device and the output port for feeding a signal to each signal input device so as to feed the signal from the signal output device to the intended signal input device.

Specifically stated, the connection relation modifying means comprises:

- device name storing means having stored therein the names of a plurality of devices connectable to the controller,
- means for displaying the device names stored in the name storing means on the screen in accordance with manipulation of the input unit, and
- device name changing means for selecting one of the connection relations displayed on the screen and changing the name of the device involved in the selected connection relation for the device name as selected from the device names displayed on the screen upon the selection of the device name.

With this specific construction, one of the connection relations displayed is selected and one of the device names displayed is selected by manipulating the input device. The name of the device involved in the selected connection relation can be changed for the selected device name merely by this procedure, whereby the connection table can be rewritten easily.

The AV control system of the present invention assures more facilitated connection to the controller than in the prior art.

BRIEF DESCRIPTION OF THE DRAWINGS

FIG. 10 is a diagram showing a connection device table;

FIG. 11 is a diagram showing the connection device table as rewritten;

FIG. 12 is a diagram showing a support device table;

FIG. 20 is a diagram showing a video input device table;

FIG. 21 is a diagram showing a sound input device table;

FIG. 22 is a diagram showing the sound input device table as rewritten;

DETAILED DESCRIPTION OF EMBODIMENT

An embodiment of the present invention will be described below in detail with reference to the drawings.

Figure 1:
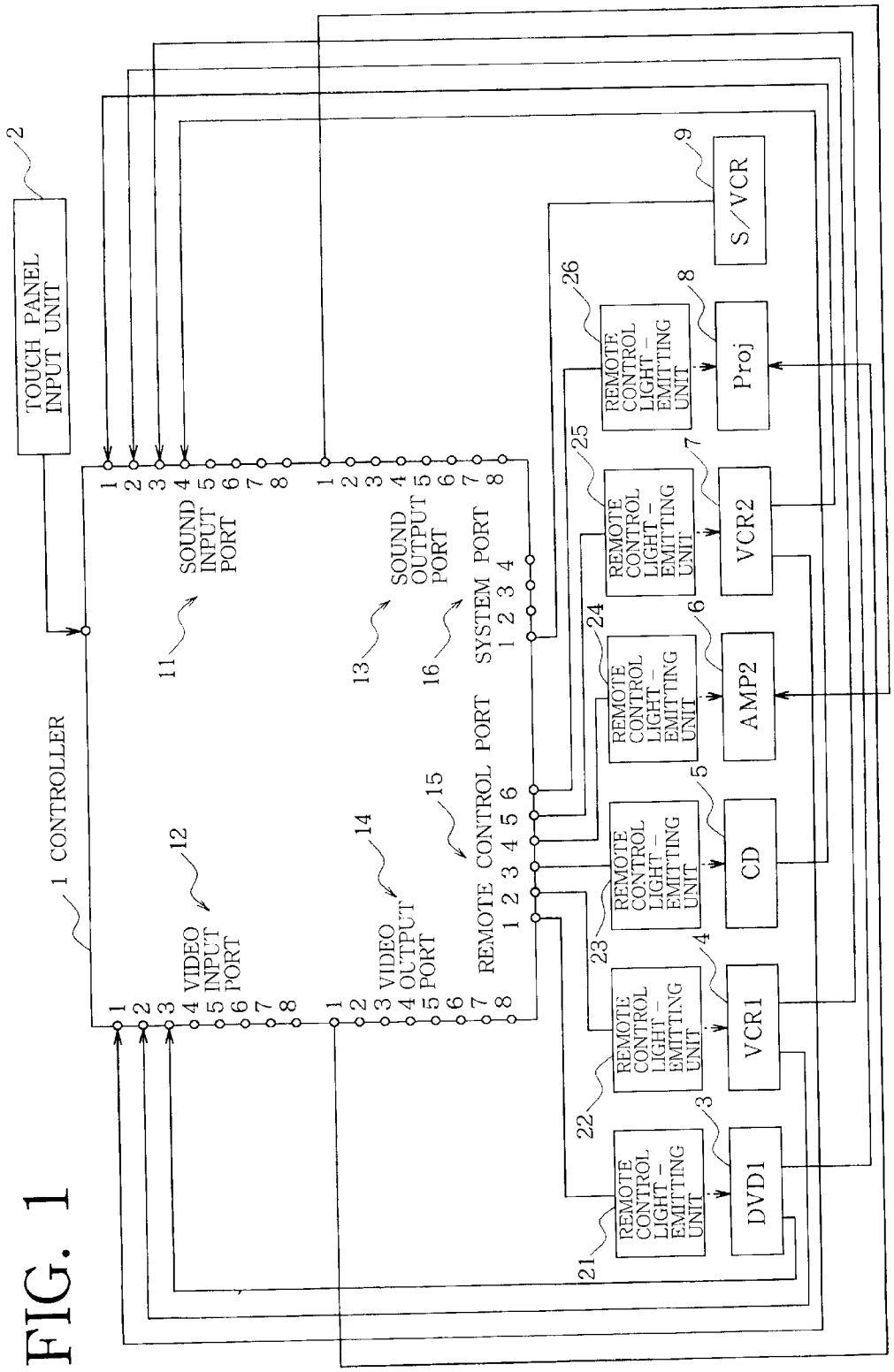
FIG. 1 is a block diagram showing the construction of an AV control system according to the invention.

With reference to FIG. 1, the present invention provides an AV control system which has a controller 1 comprising a microcomputer or the like and having connected thereto a touch panel input unit 2 provided with an image display screen, for example, of a liquid-crystal display and a touch panel covering the screen. Also connected to the controller 1 are AV devices, i.e., DVD1 3, VCR1 4, CD player 5, AMP 2 6, VCR2 7, liquid-crystal projector 8 and system VCR 9.

Figure 30:
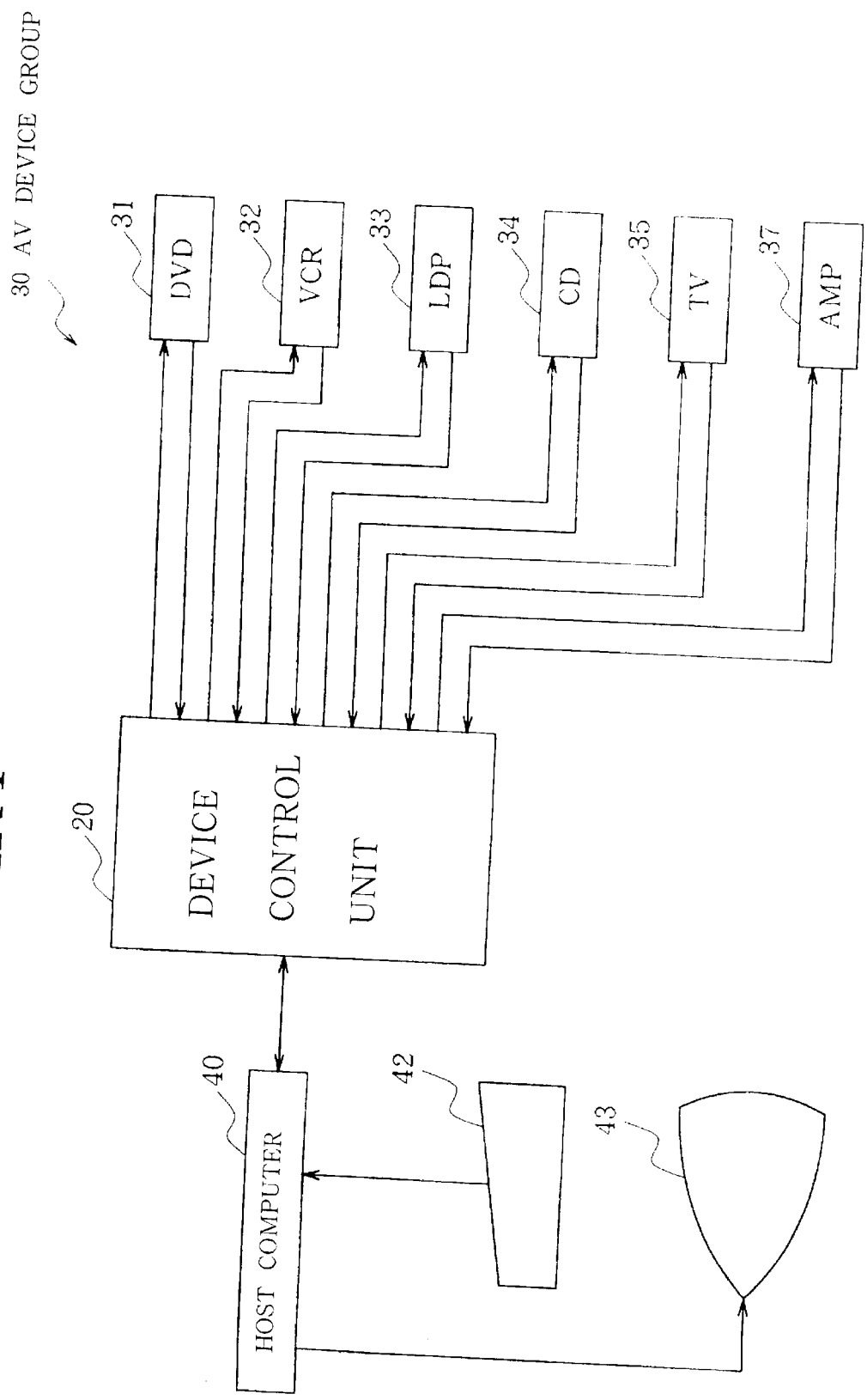
FIG. 30 is a block diagram showing a conventional AV control system.

The controller 1 has the functions of both the device control unit 20 and the host computer 40 which constitute the conventional AV control system shown in FIG. 30, and further has the function of setting the connections of the AV devices to the controller 1 solely by selectively manipulating the touch panel input unit 2 as will be described later. The touch panel input unit 2 has incorporated therein a microcomputer, controls the display of images on the image display screen and processes communication with the controller 1.

More specifically, the controller 1 has six remote control ports 15, four system ports 16, eight sound input ports 11, eight video input ports 12, eight sound output ports 13 and eight video output ports 14. Six remote control light-emitting units 21 to 26 are connected to the respective remote control ports 15 and arranged in corresponding relation to remote control light-receiving units (not shown) provided respectively on DVD1 3, VCR1 4, CD player 5, AMP2 6, VCR2 7 and liquid-crystal projector 8 for transmitting control signals to these AV devices. The system VCR 9, for example, for use in unattended recording of preselected programs is connected directly to one system port 16 of the controller 1 for two-way communication with the controller 1.

Connected respectively to four sound input ports 11 of the controller 1 are the sound output terminals of VCR2 7, VCR1 4, DVD1 3 and CD player 5 which are sound output devices. The video output terminals of VCR2 7, VCR1 4 and DVD1 3, which are video output devices, are connected respectively to three video input ports 12 of the controller 1. Connected to one sound output port 13 of the controller 1 is the sound input terminal of AMP2 6 which is a sound input device. Further connected to one video output port 14 of the controller 1 is the video input terminal of the liquid-crystal projector 8 which is a video input device.

Each of the remote control light-emitting units 21 to 26 arranged as opposed to the remote control light-receiving units of the AV devices 3 to 8, or the system VCR 9 can be connected to any of the remote control ports 15, or to any of the system ports 16 as desired. The connection relations are prescribed by control port connection setting as will be described below.

The user can determine as desired to which of the sound input ports 11 or video input ports 12 of the controller 1 the sound output terminals or video output terminals of the AV devices 3 to 9 are to be connected, or to which of the sound output ports 13 or video output port 14 of the controller 1 the sound input terminals or video input terminals of the AV devices 3 to 9 are to be connected. The connection relations are prescribed by the AV port connection setting to be described below.

Figure 2:
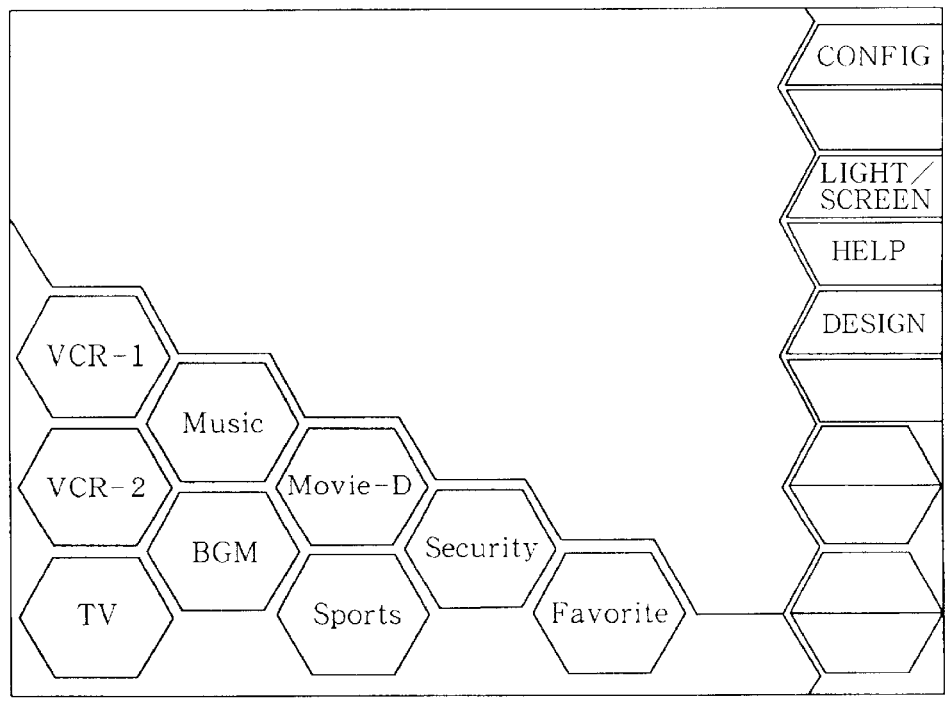
FIG. 2 is a diagram showing a top frame.

When the power supply for the AV control system of the invention is turned on, a top frame as shown in FIG. 2 is displayed on the screen of the touch panel input unit 2. Shown on the frame are a plurality of contents select buttons such as "VCR-1," "VCR-2," "TV," "MUSIC" and "SPORTS." When one of the contents select buttons is selectively manipulated, the required one or more of the AV devices are commanded to execute a predetermined operation corresponding to the button.

Figure 25:
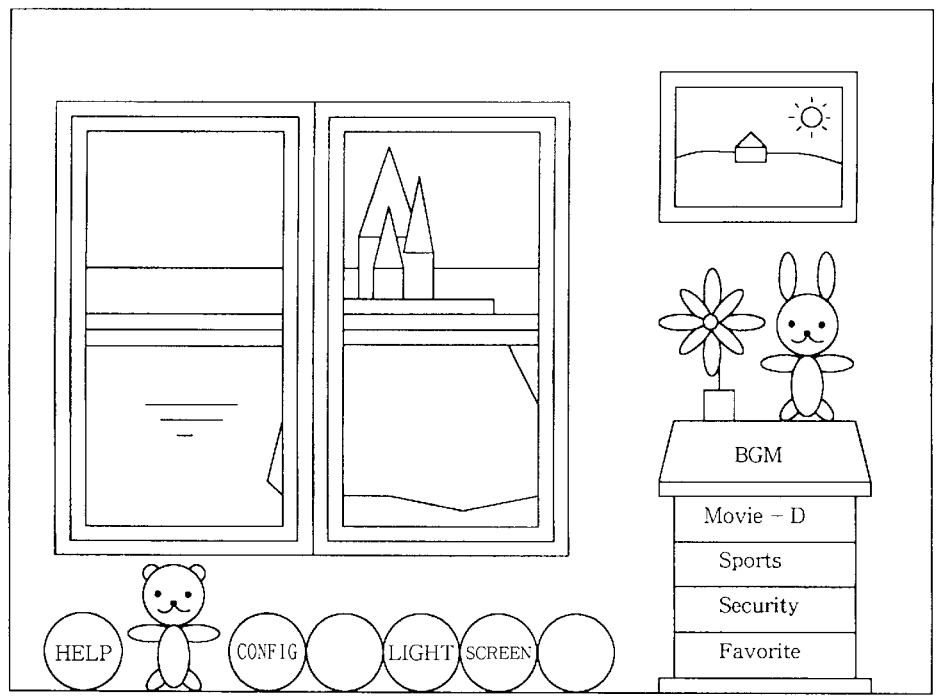
FIG. 25 is a diagram showing a top frame of different design.
Figure 26:
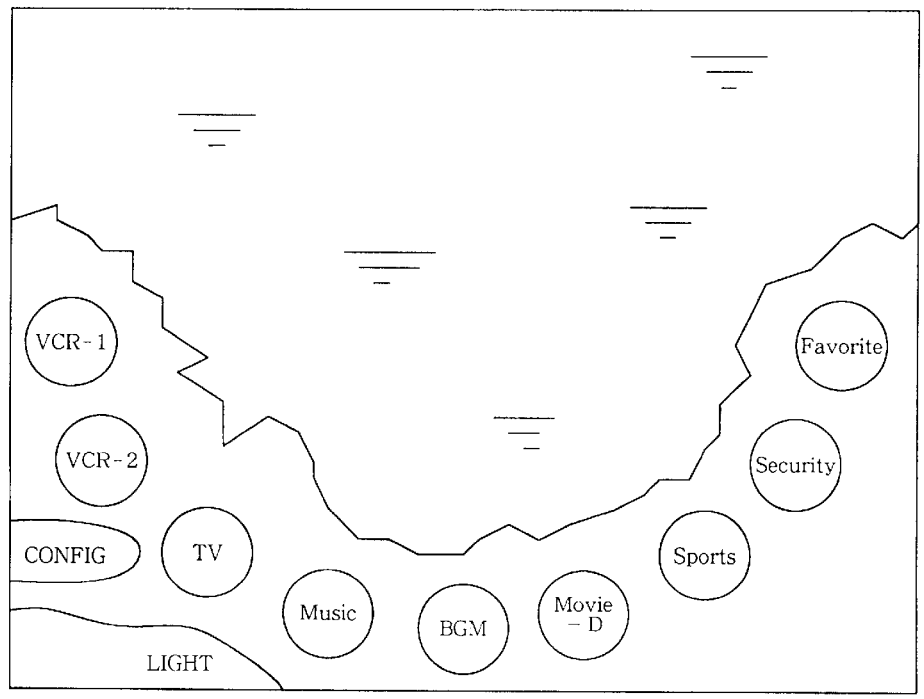
FIG. 26 is a diagram showing a top frame of other design.

By manipulating "DESIGN" button shown on the top frame, it is possible to change the arrangement or background picture of the contents buttons on the top frame for the other button arrangement or background picture shown in FIG. 25 or 26.

Figure 3:
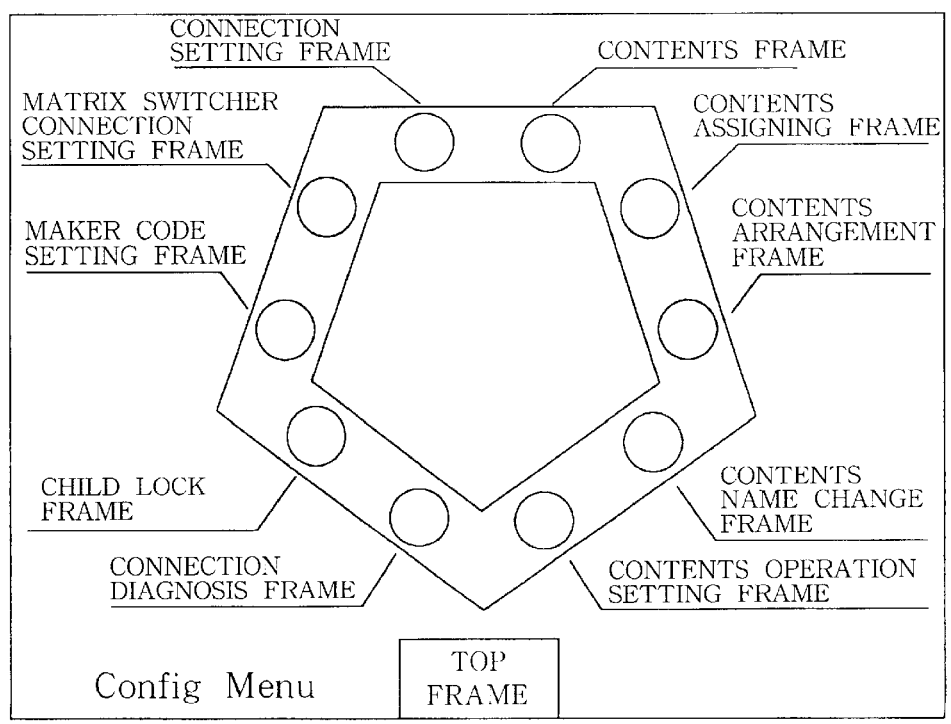
FIG. 3 is a diagram showing CONFIG frame.

Shown at the right upper corner of the top frame in FIG. 2 is "CONFIG" button which is to be manipulated to switch the display between a plurality of frames for setting various operations. When "CONFIG" button on the top frame is manipulated, CONFIG frame shown in FIG. 3 is displayed, in which manual buttons are shown for switching the display between the frames. These buttons include a "connection setting frame" button which is to be manipulated for control port connection setting, or a "matrix switcher connection setting frame" button which is to be manipulated for AV port connection setting.

Control Port Connection Setting

Figure 4:
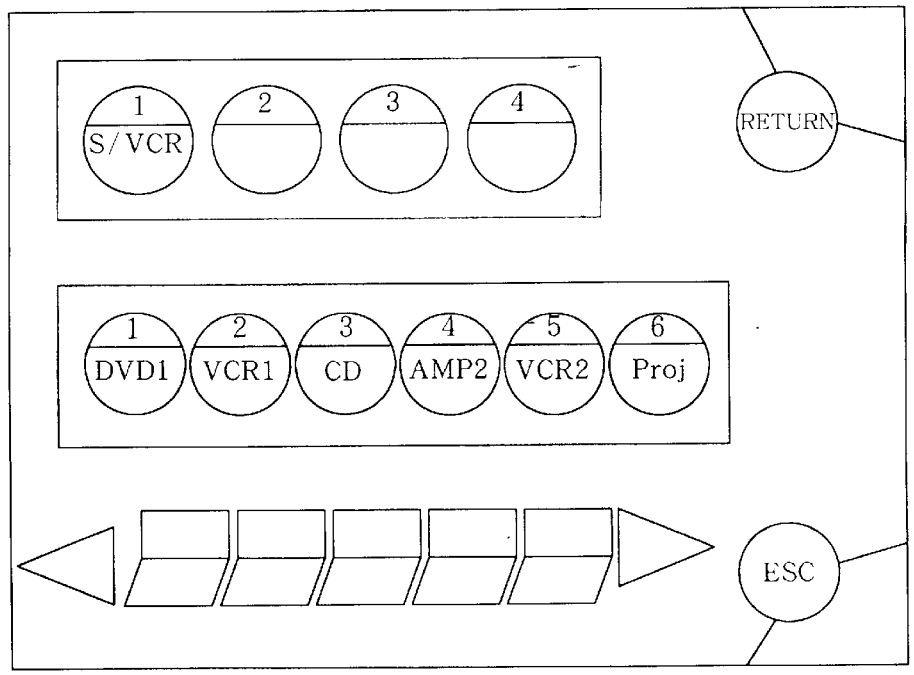
FIG. 4 is a diagram showing a connection setting frame.

When the "connection setting frame" button is manipulated on CONFIG frame of FIG. 3, a connection device table as shown in FIG. 10 is read from the controller 1, and a connection setting frame shown in FIG. 4 is displayed on the screen of the input device 2 with reference to the device table. Shown in the uppermost column of this frame are four port buttons corresponding to the four system ports of the controller 1 and each having a port number and a connection device name space. Shown in the middle column of this frame are six port buttons corresponding to the six remote control ports of the controller 1 and each having a port number and a connection device name space.

Figure 9:
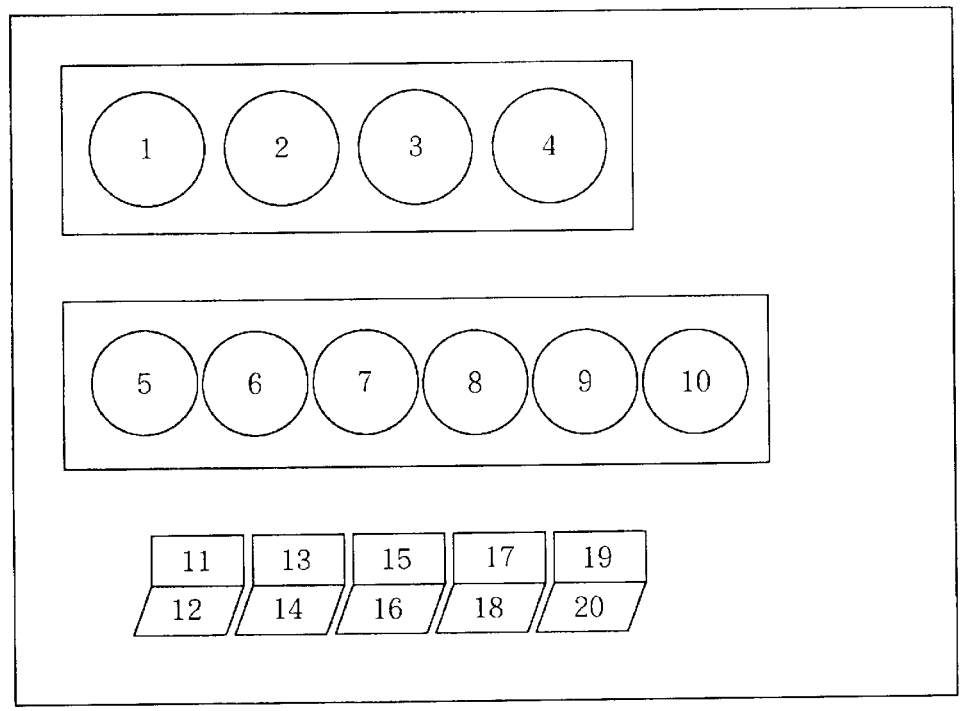
FIG. 9 is a diagram showing button codes assigned to respective button displayed positions on the connection setting frame.

The connection device table has written therein for the respective devices to be connected button codes ("1" to "10") for specifying the displayed positions on the screen of the input unit 2, and the names of the devices (such as "S/VCR" and "DVD1") as shown in FIG. 10. The button codes "1" to "10" are given in corresponding relation to the displayed positions of the four port buttons of the system ports and the six port buttons of the remote control ports as shown in FIG. 9, and the device names listed in the connection device table are shown as the respective button names as seen in FIG. 4 according to the corresponding relation.

Further with reference to FIG. 4, shown in the lowermost column of the connection setting frame are a plurality of device buttons for indicating the names of all the devices to be connected, the column thus serving as a device name column.

Figure 5:
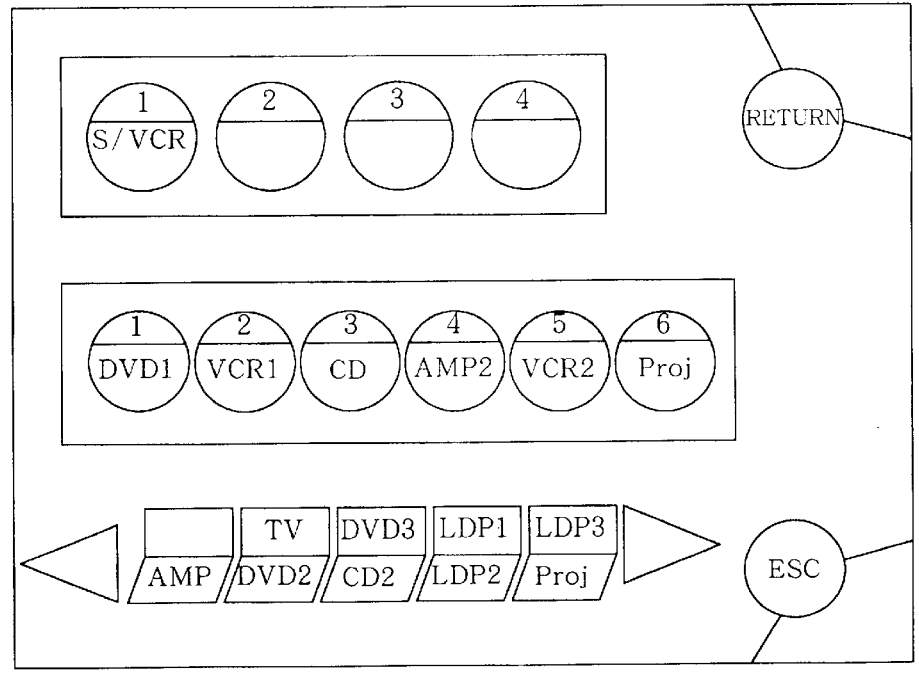
FIG. 5 is a diagram showing the connection setting frame having the names of support devices read into a device name column.

After the table is read, a support device table as shown in FIG. 12 is read from the controller 1, whereupon the names of connectable devices are shown in the device name column (device buttons) on the connection setting frame with reference to the table as shown in FIG. 5.

Figure 6:
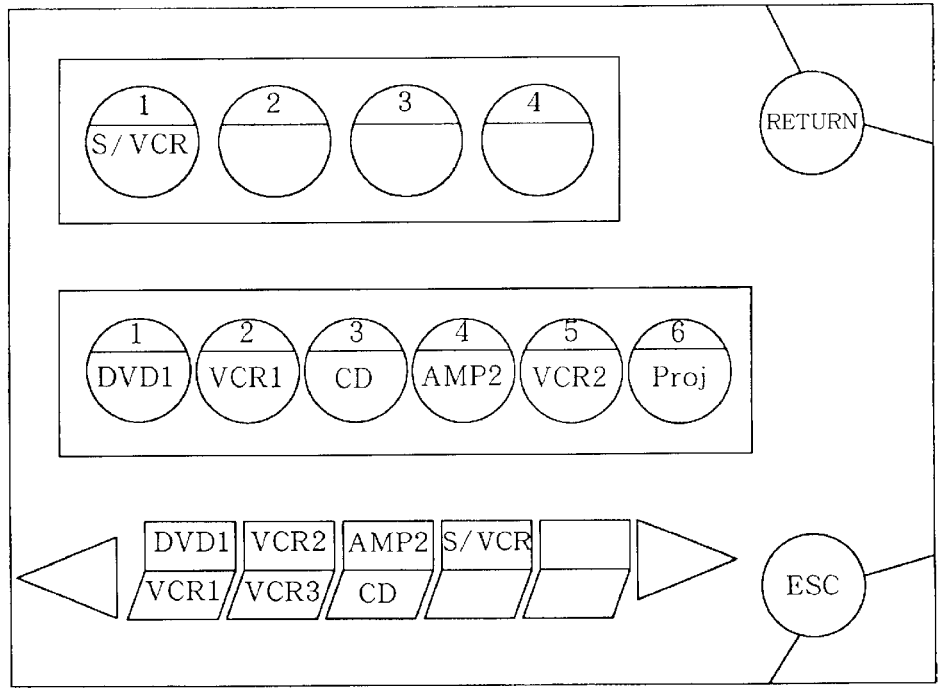
FIG. 6 is a diagram showing the connection setting frame when the device name column is scrolled.

Provided at the left and right of the device name column are manual buttons for scrolling this column righward or leftward. For example, when "NEXT" button at right is manipulated, the device name column on display is shifted leftward to show the remaining device names as shown in FIG. 6.

With reference to FIG. 12, the support device table has listed therein for all the connection devices supported by the controller 1 order codes ("1" to "16") showing the order of arrangement on the screen of the input unit 2, and the names of the support devices (such as "AMP" and "TV"). The order codes "1" to "16" correspond to the displayed positions of the button codes "11" to "20" shown in FIG. 9. When the device name column is scrolled leftward or rightward as stated above, the device names are replaced according to the order codes.

The connection setting frame of FIG. 5 shows the state of connection as the initial or previous values (before a change). When the connection of the device to the system port or remote control port is subsequently changed, the connection setting is changed as will be described below.

Figure 7:
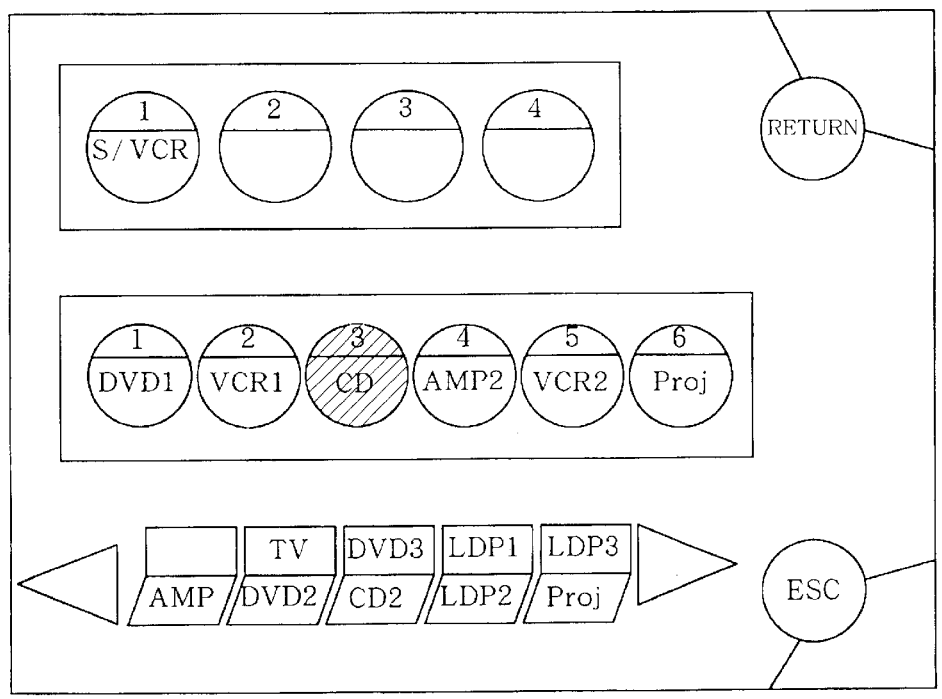
FIG. 7 is a diagram showing the connection setting frame when one port button is manipulated.

With reference to the connection setting frame shown in FIG. 5, when the CD player "CD" connected to the remote control port with the port number "3" is changed to the laser disk player "LDP2," the third port button "CD" is selected and manipulated as shown in FIG. 7, whereby the button is shown with its color changed to green.

Figure 8:
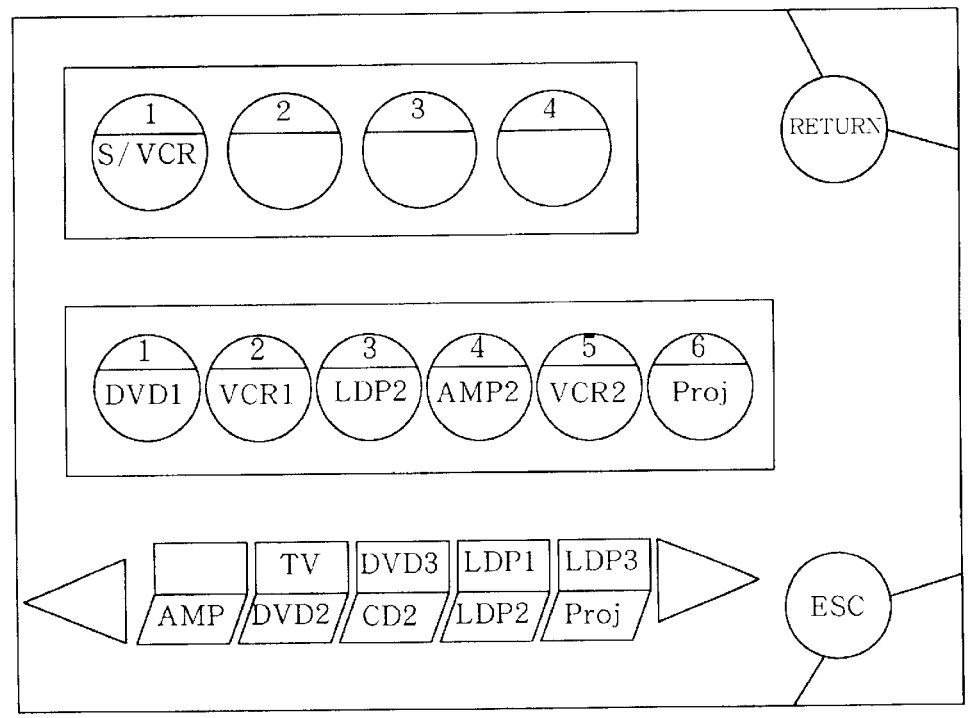
FIG. 8 is a diagram showing the connection setting frame when the name of the port button is changed by manipulating one device button.

The name of the AV device connected anew, i.e., "LDP2," is next manipulated as selected from the device name column at the lowermost location of the connecting setting frame. This changes the button name of the port number "3" of the remote control port to "LDP2" as shown in FIG. 8.

"RETURN" button is thereafter manipulated, whereupon the connection device table registered in the controller 1 and prescribing the relations between the remote control ports 15 and the connection devices are rewritten as shown in FIG. 11, indicating the setting that the laser disk player "LDP2" is connected to the third remote control port 15. As a result, the laser disk player is made controllable by the controller 1.

Figure 13:
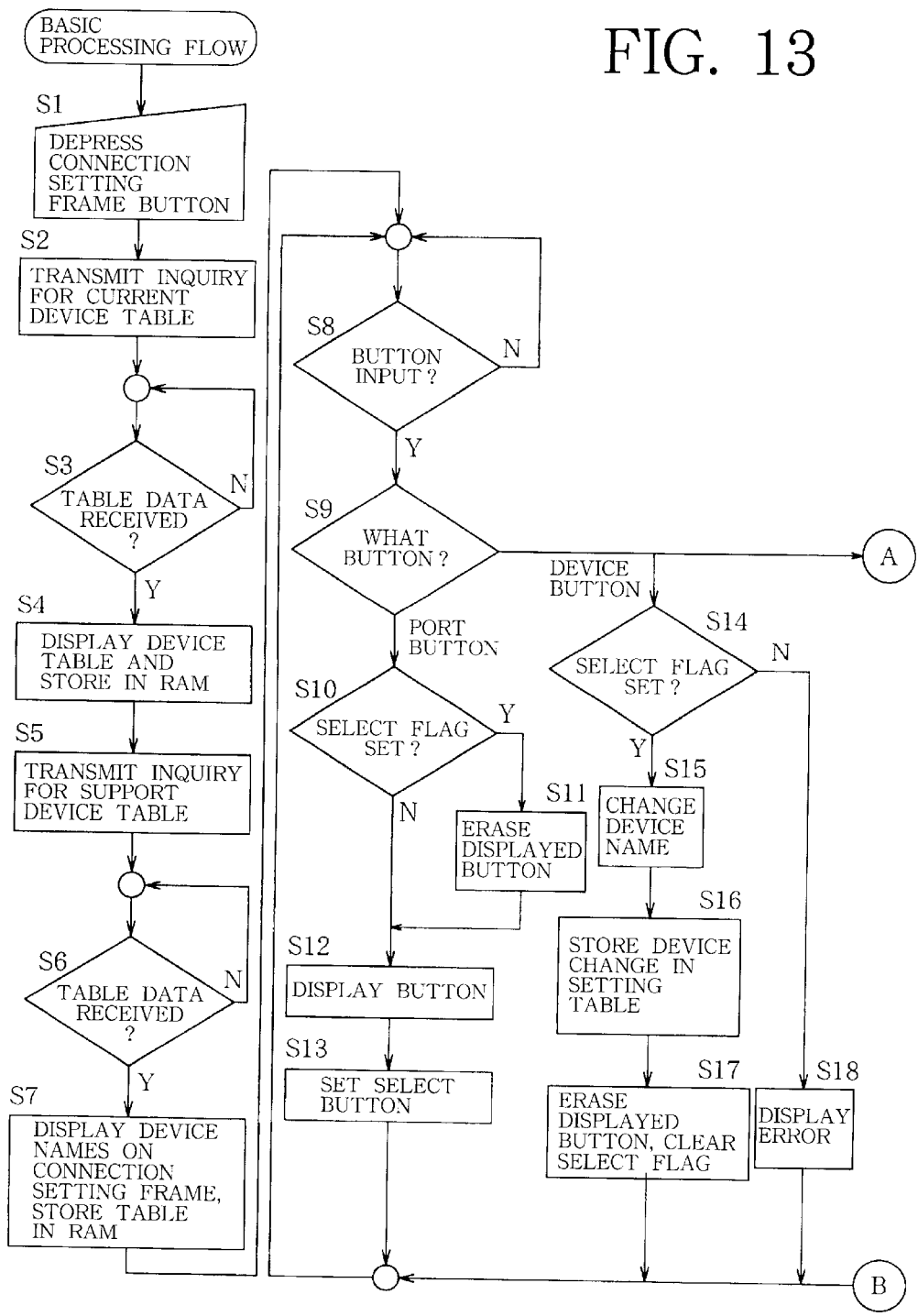
FIG. 13 is a flow chart showing part of a control port connecting setting procedure.
Figure 14:
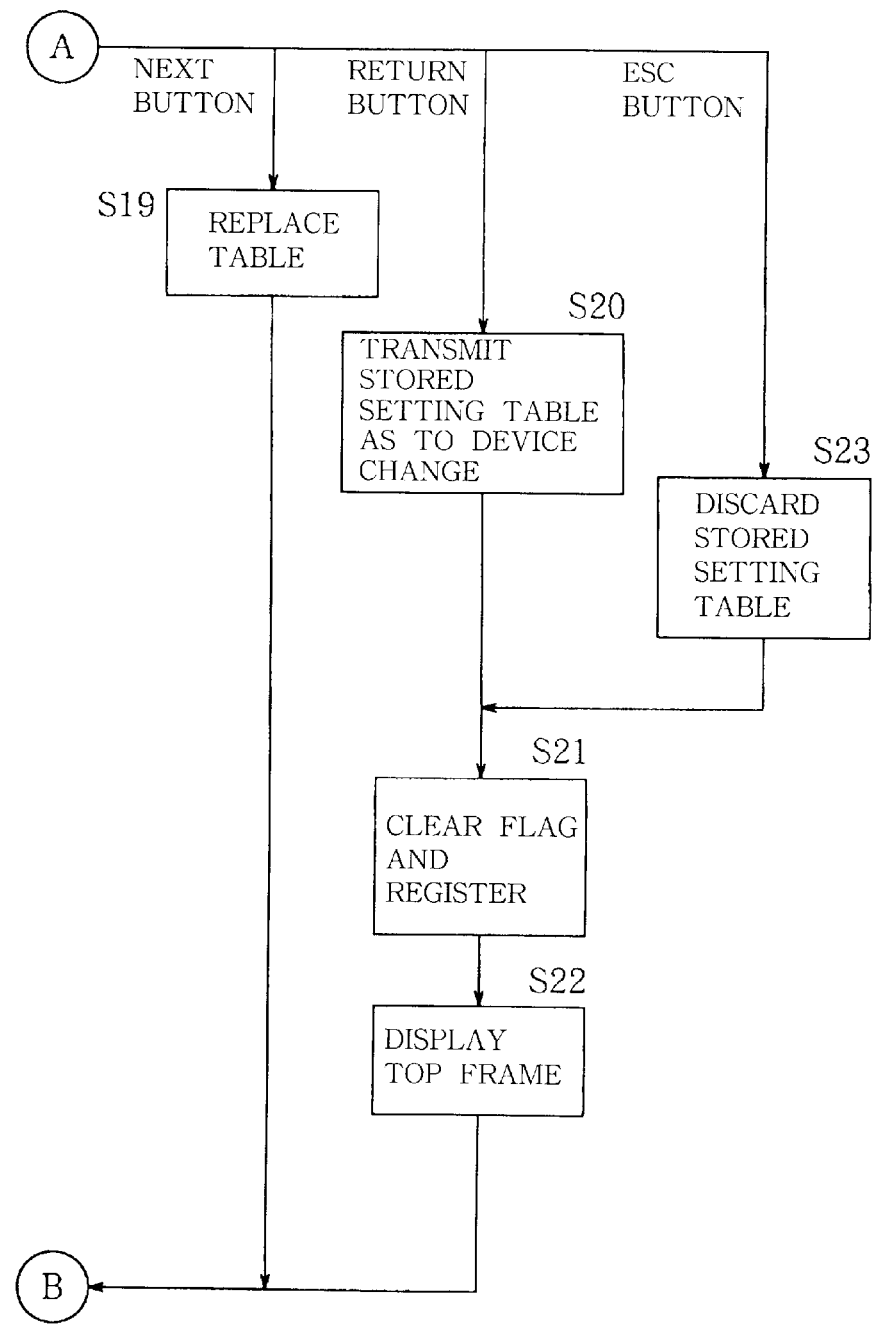
FIG. 14 is a flow chart showing the remainder of the procedure.

FIGS. 13 and 14 show the procedure (basic processing flow) to be executed by the touch panel input unit 2 in order to realize the remote control port connection setting described.

First, the "connection setting frame" button is depressed on CONFIG frame of FIG. 3 in step S1 of FIG. 13, whereupon an inquiry command is transmitted in step S2 for reading the current connection device table from the controller 1. Step S3 then inquires whether the table data has been received. If the answer is affirmative, the connection setting frame is displayed with reference to the received connection device table as shown in FIG. 4, and the table is stored in a RAM in step S4.

Subsequently, an inquiry command is transmitted in step S5 for reading the support device table from the controller 1. Step S6 then inquires whether the table data has been received. If the answer is affirmative, the names of a plurality of devices are shown in the device name column on the connection setting frame with reference to the received support device table as shown in FIG. 5, and the table is stored in the RAM in step S7.

An inquiry is thereafter made in step S8 as to whether there is any button input. When the answer is affirmative, step S9 identifies the button. If the button is found to be a port button, an inquiry is made in step S10 as to whether a select flag is set. When the manipulation of the port button is the first time, the inquiry is answered in the negative, followed by step S12, in which the manipulated port button is displayed in green.

If the manipulation of the port button is the second time, on the other hand, the answer is found to be affirmative in step 10, followed by step S11 to erase the port button displayed in green by the first manipulation. Subsequently the sequence proceeds to step S12 and then to S13 to set the select flag, followed by step S8 again.

When one device button in the device name column is thereafter depressed on the connection setting frame, the sequence proceeds from step S9 to step S14 to inquire whether the select flag is on. If the device button is manipulated subsequent to the port button, the answer to the inquiry is found to be affirmative, followed by step S15.

The name of the device selected by the manipulation of the port button on the connection setting frame is changed in step S15 to the name of the device given to the device button manipulated. The change of device is preserved in a setting table in step S16, the port button displayed in green is then erased in step S17, and the select flag is cleared, whereupon the sequence returns to step S8.

Alternatively when the inquiry of step S14 is answered in the negative, indicating that no port button has been manipulated, step S18 follows to display an error to this effect, and the sequence returns to step S8.

When "NEXT" button is thereafter manipulated, the sequence proceeds from step S9 to step S19 of FIG. 14, in which the support device table to be shown in the device name column of the connecting setting frame is replaced by scrolling, followed by step S8 of FIG. 13 again.

When "RETURN" button is thereafter depressed, the sequence proceeds from step S9 to FIG. 14, step S20 to transmit the preserved setting table indicating a change of device to the controller 1. The flag and register are cleared in step S21, the top frame is displayed in step S22, and the sequence returns to FIG. 13, step S8.

When "ESC" button is manipulated, on the other hand, the sequence proceeds from step S9 to FIG. 14, step S23, and the preserved setting table is discarded, followed by step S21.

When the setting table as to the change of device is transmitted from the input unit 2 to the controller 1, the controller 1 rewrites the connection device table as shown in FIG. 11 with reference to the table. As a result, the connection table prescribing the connection relations between the control ports and the devices is rewritten, and the device connected to the remote control port 15 anew is made controllable by the controller 1.

AV Port Connection Setting

Figure 15:
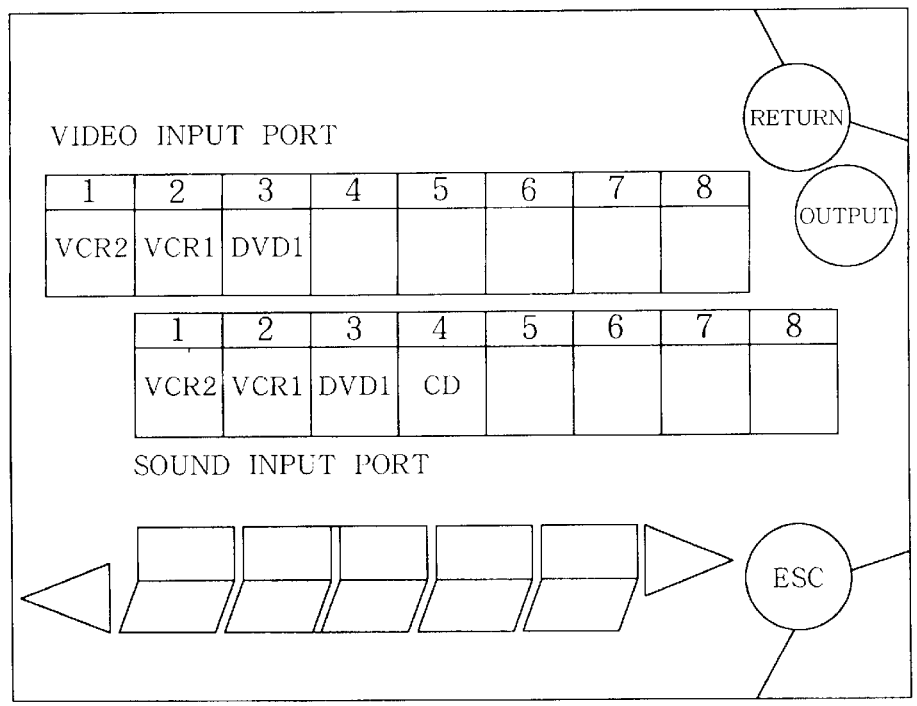
FIG. 15 is a diagram showing an input port connection setting frame.

When the "matrix switcher connection setting frame" button is manipulated on CONFIG frame of FIG. 3, a video input device table as shown in FIG. 20 and a sound input device table as shown in FIG. 21 are read from the controller 1, and an input port connection setting frame shown in FIG. 15 is displayed on the screen of the input unit 2 with reference to these tables. Shown in the uppermost column of this frame are a plurality of port buttons corresponding to the eight video input ports of the controller 1 and each having a port number and a connection device name space to indicate the video input port relations. Further shown in the middle column of this frame are plurality of port buttons corresponding to the eight sound input ports of the controller 1 and each having a port number and a connection device name space to indicate the sound input port relations.

Figure 19:
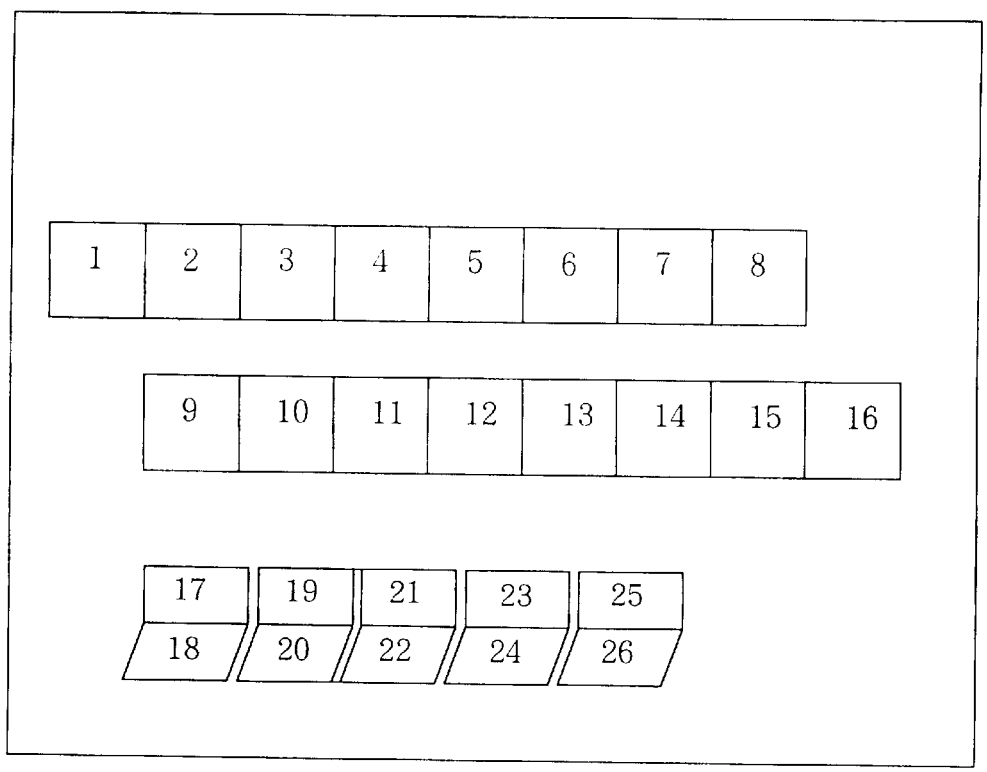
FIG. 19 is a diagram showing button codes assigned to the respective button displayed positions on the port connection setting frames.

As shown in FIG. 20, the video input device table has written therein for the respective connection devices button codes ("1" to "8") for specifying the displayed positions on the screen of the input unit 2, and the names of the devices (such as "VCR 2" and "VCR 1"). As seen in FIG. 21, the sound input device table has written therein for the respective connection devices button codes ("9" to "16") for specifying the displayed positions on the screen of the input unit 2, and the names of the devices (such as "VCR 2" and "VCR 1"). The button codes "1" to "16" are given in corresponding relation to the displayed positions of the names of port buttons indicating the video input port connection relations and the sound input port connection relations as shown in FIG. 19, and the device names listed in the video input device table and the sound input device table are shown as the respective button names as seen in FIG. 15 according to the corresponding relations.

Further shown in the lowermost column of the input ort connection setting frame are a plurality of device buttons for indicating the names of all the devices actually connected to the controller 1 to provide a device name column.

Figure 16:
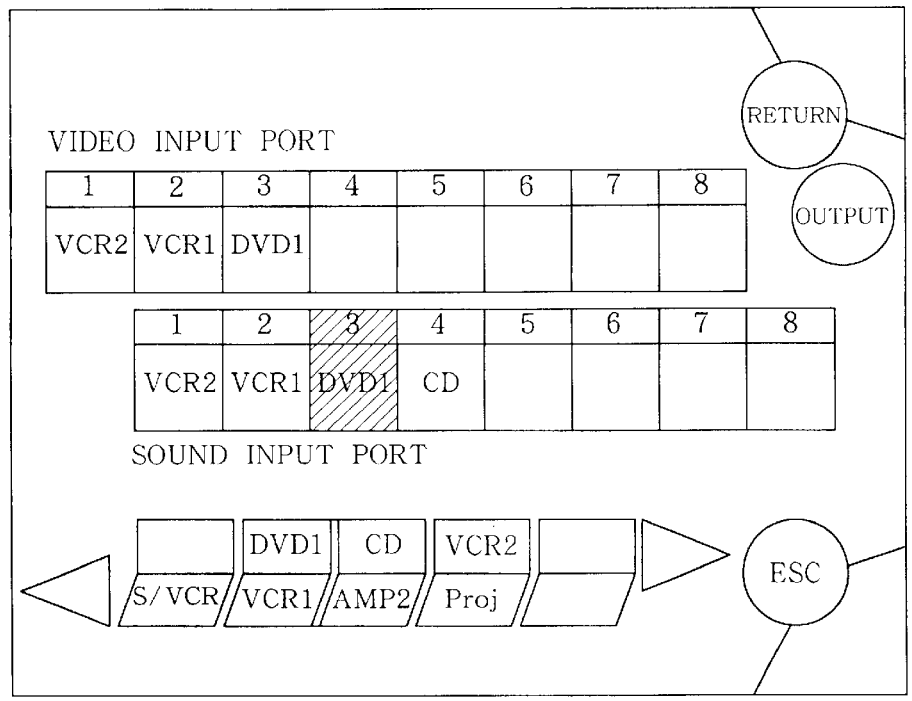
FIG. 16 is a diagram showing the input port connection setting frame with connection device names listed in a device name column.

After the video input device table and the sound input device table have been read, a port button indicating either of the connection relations is selected and manipulated, whereupon the connection device table shown in FIG. 11 is read from the controller 1, and the names of the devices actually connected are shown in the device name column (device buttons) on the input connection setting frame as seen in FIG. 16 with reference to the connection device table. At this time, the names of the device buttons are shown in displayed positions of the button codes "17" to "26" shown in FIG. 19 in the order listed in the table of FIG. 11.

The input port connection setting frame of FIG. 15 shows the state of connection as the initial or previous values. When the connection of the device to the video input port 12 or sound input port 11 is subsequently hanged, the connection setting is changed as will be described below.

With reference to the input port connection setting frame shown in FIG. 15, when the digital video disk player "DVD1" connected to the sound input port with the port number "3" is changed to the system VCR "S/VCR," the third port button "DVD1" indicating the sound input port connection relation is selected and manipulated as shown in FIG. 16, whereby the button is shown with its color changed to green, and the names of the devices actually connected are shown in the lowermost device name column on the input port connection setting frame.

Figure 17:
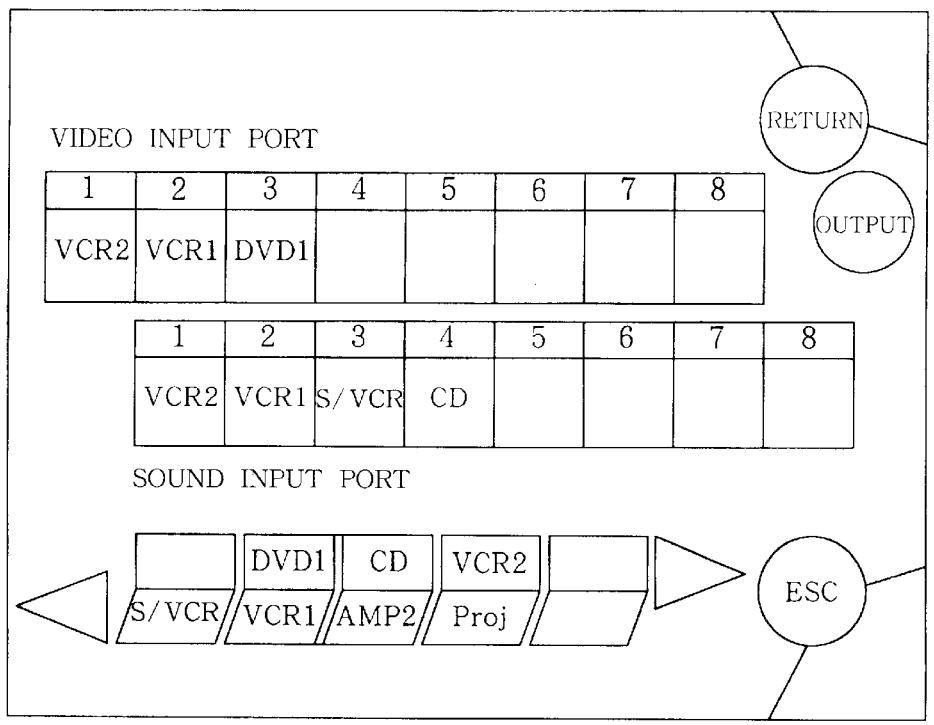
FIG. 17 is a diagram showing the input port connection setting frame when the name of a port button is changed by manipulating one device button.

The device button "S/VCR" given the name of the AV device connected anew is selected from the device name column and manipulated, whereby the name of the third port button indicating the sound input port connection relation is changed for "S/VCR" as shown in FIG. 17.

When "RETURN" button is thereafter manipulated, the connection device table registered in the controller 1 and prescribing the relations between the sound input ports 11 and the connection devices is rewritten as shown in FIG. 22, and the state in which the system VCR is connected to the third sound input port 11 is set. Consequently, the sound signal from the system VCR can be fed to the controller 1.

Figure 18:
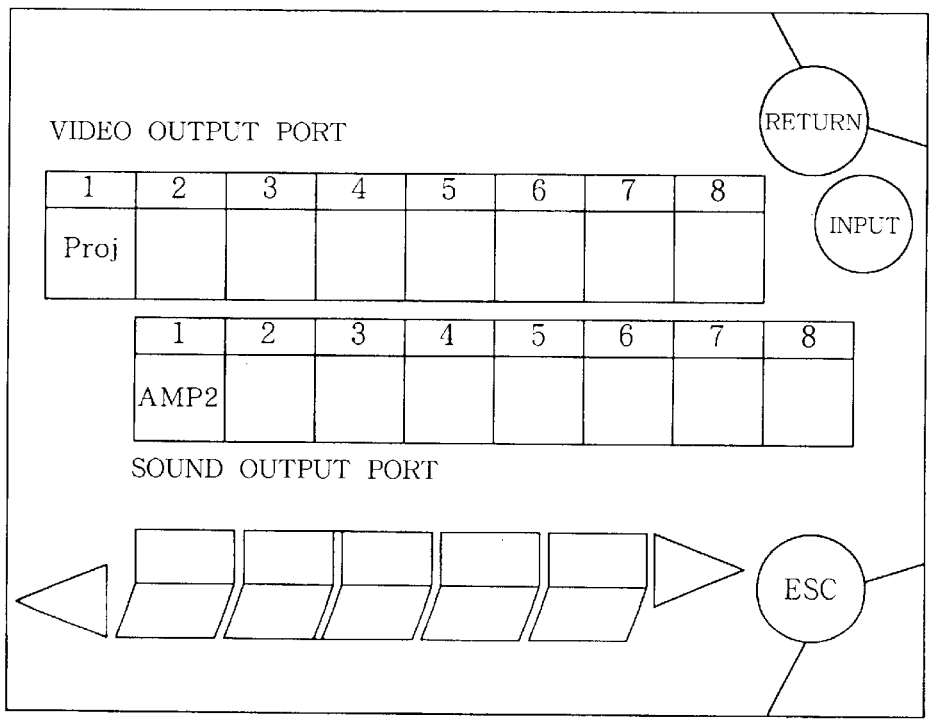
FIG. 18 is a diagram showing an output port connection setting frame.

Further manipulation of "OUTPUT" button on the input port connection setting frame of FIG. 15 displays an output port connection setting frame shown in FIG. 18, making possible connection setting of the video output port 14 and sound output port 13 in exactly the same manner as the input port connection setting.

Figure 23:
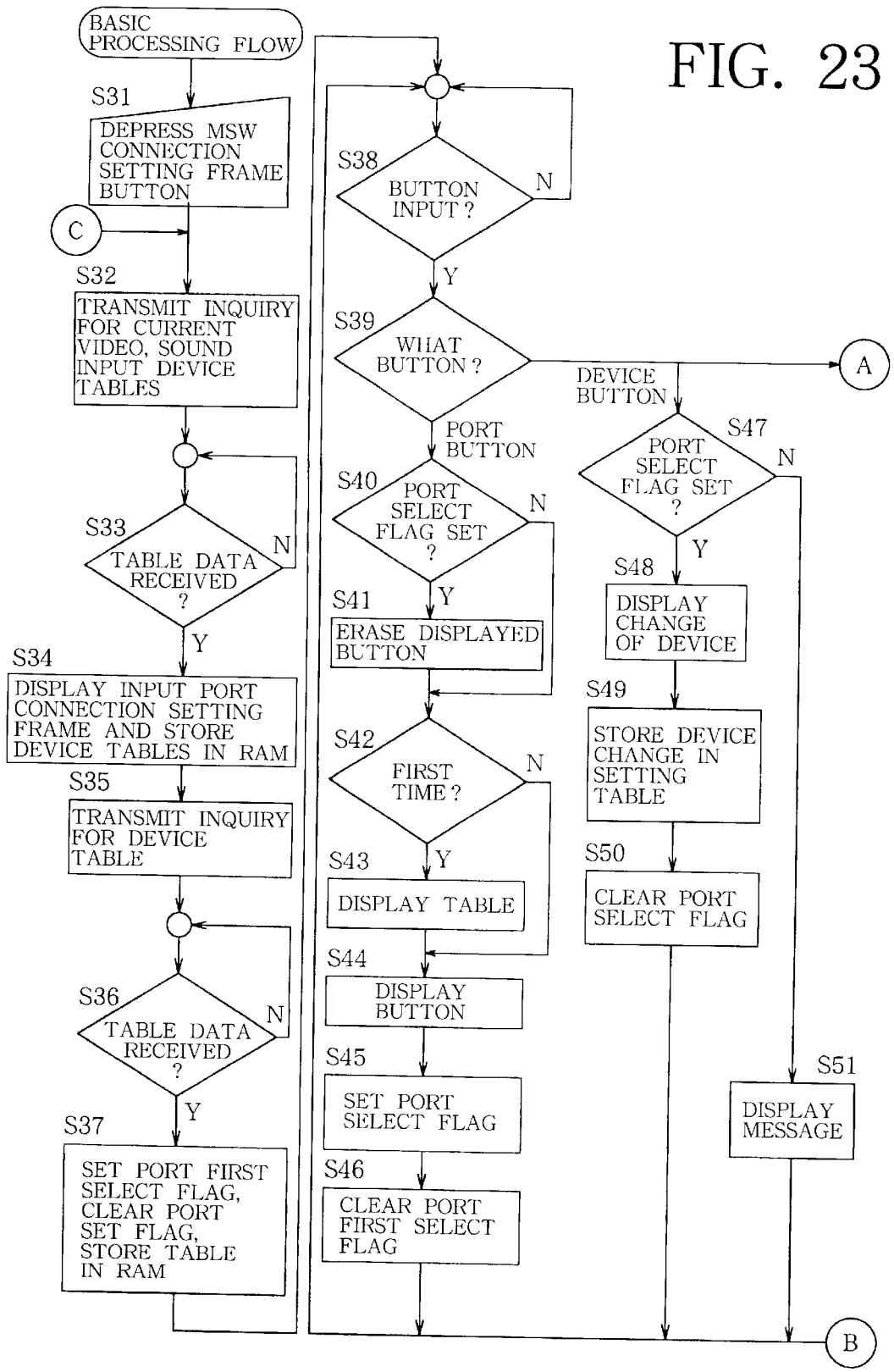
FIG. 23 is a flow chart showing part of an AV port connection setting procedure.
Figure 24:
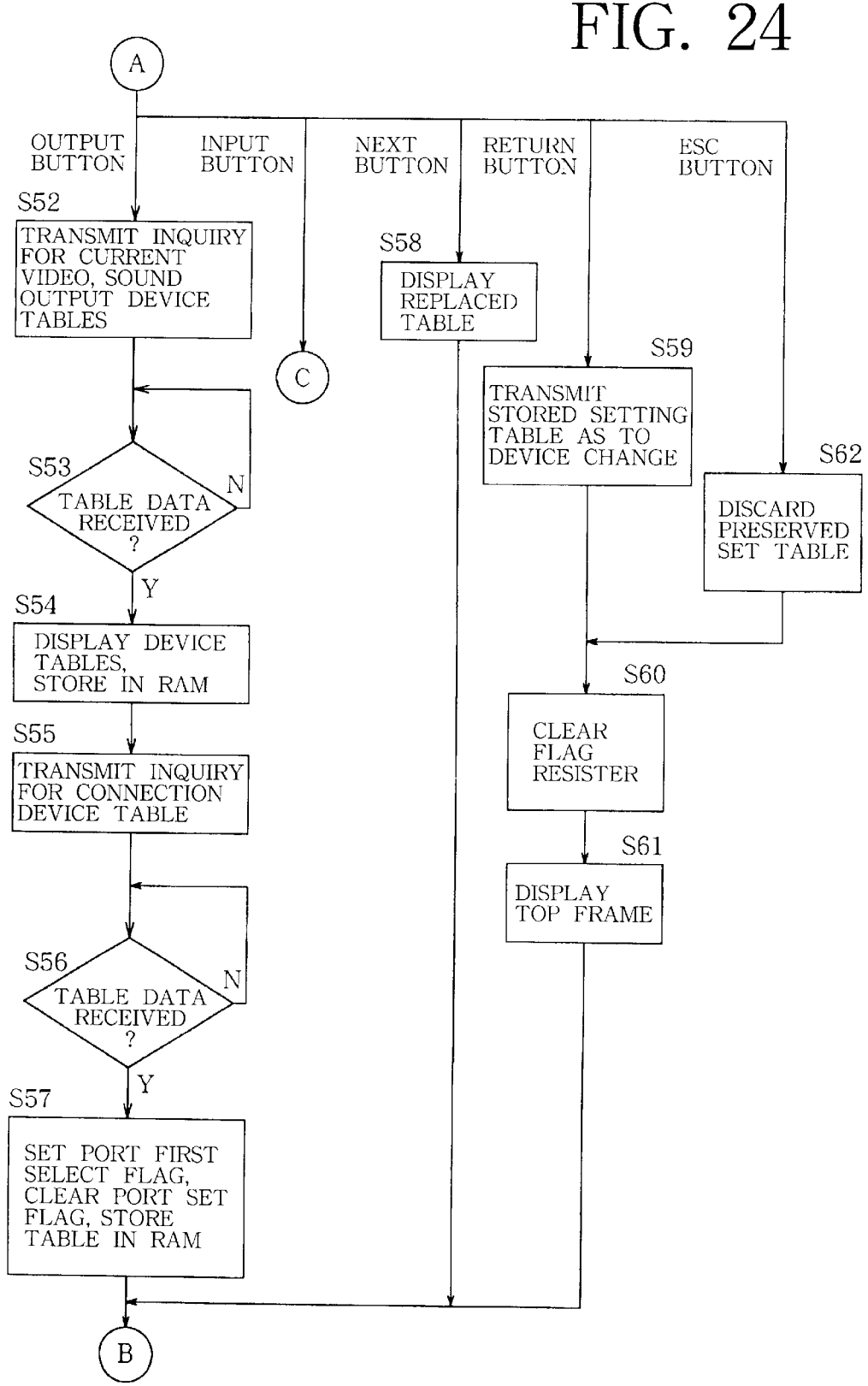
FIG. 24 is a flow chart showing the remainder of the procedure.

FIGS. 23 and 24 show the procedure (basic processing flow) to be performed by the input unit 2 for realizing the AV port connection setting described.

First, the "matrix switcher (MSW) connection setting frame" button is depressed on CONFIG frame of FIG. 3 in step S31 of FIG. 23, whereupon an inquiry command is transmitted in step S32 for reading the current video input device table and sound input device table from the controller 1. Step S33 then inquires whether the data as to the two tables has been received. If the answer is affirmative, the input port connection setting frame is displayed with reference to the received device tables as shown in FIG. 15, and the tables are stored in a RAM in step S34.

Subsequently, an inquiry command is transmitted in step S35 for reading the connection device table shown in FIG. 11 from the controller 1. Step S36 then inquires whether the table data has been received. If the answer is affirmative, a "port first select flag" is set, a "port select flag" is cleared, and the device table is stored in the RAM in step S37.

An inquiry is thereafter made in step S38 as to whether there is any button input. When the answer is affirmative, step S39 identifies the button. If the button is found to be a port button, an inquiry is made in step S40 as to whether the port select flag is set. When the manipulation of the port button is the first time, the inquiry is answered in the negative, followed by step S42.

Step S42 inquires whether the "port first select flag" is set. When the manipulation of the port button is found to be the first time, the inquiry is answered in the affirmative, the connection device table is displayed in the device name column as shown in FIG. 16 in step S43, and the manipulated port button is displayed with its color changed to green in step S44. The port select flag is then set in step S45, the port first select flag is cleared in step S46, and the sequence returns to step S38.

When the port button is manipulated thereafter again, the inquiry of step S40 is answered in the affirmative, and the port button already manipulated and displayed in green is cancelled in step S41. Since the port first select flag has been cleared, the inquiry of the subsequent step S42 is answered in the negative, followed by step S44 to omit redisplay of the connection device table already shown.

When the device button shown in FIG. 16 is manipulated, the sequence proceeds from step S39 to step S47 to inquire whether the port select flag is set. When the device button is manipulated subsequent to the port button, the answer to this inquiry is affirmative, followed by step S48.

In step S48, the device name selected by manipulating the port button on the connection setting frame is changed for the device name given to the manipulated device button. The change of device is stored in the setting table in the next step S49, and the port select flag is cleared subsequently in step S50, followed by step S38 again. When the inquiry of step S47 is answered in the negative, indicating that no port button is selected, the sequence proceeds to step S51 to show a message to this effect, and the sequence thereafter returns to step S38.

When "OUTPUT" button is manipulated, the sequence proceeds from step S39 to FIG. 24, step S52 to transmit an inquiry command for reading the current video output device table and sound output device table from the controller 1. Step S53 inquires whether the data as to the two device tables has been received. If the answer is affirmative, an output port connection setting frame is displayed as shown in FIG. 18, and the tables are stored in the RAM in step S54.

An inquiry command is then transmitted in step S55 for reading out the connection device table of FIG. 11 from the controller 1. Step S56 inquires whether the table data has been received. If the answer is affirmative, step S57 follows to set the "port first select flag," clear the port select flag, and store the connection device table in the RAM. The sequence thereafter returns to FIG. 23, step S38. When "INPUT" button is manipulated, step S32 of FIG. 23 follows again.

When "NEXT" button is manipulated, the sequence proceeds from FIG. 23, step S39 to FIG. 24, step S58 to replace the connection device table to be displayed in the device name column on the connection setting frame by scrolling the column, and the sequence thereafter returns to step S38 of FIG. 23.

When "RETURN" button is manipulated, the sequence proceeds from step S39 to FIG. 24, step S59 to transmit the stored setting table as to the device change to the controller 1. The flag and register are cleared in step S60, the top frame is displayed in step S61, and the sequence then returns to step S38 of FIG. 23.

When "ESC" button is manipulated, on the other hand, the sequence proceeds from step S39 to FIG. 24, step S62, and the stored setting table is discarded, followed by step S60.

When the setting table as to the change of device is transmitted from the input unit 2 to the controller 1, the controller 1 rewrites the connection device table with reference to the table. As a result, the connection table prescribing the connection relations between the ports and the devices is rewritten, and the controller 1 is made ready to process the input and output of video signals or sound signals for the device connected to the input port 11, 12 and output port 13, 14.

Maker Code Setting Function

When the maker (kind) of the device to be connected to the controller 1 for use in the AV control system of the invention is changed, a new maker code can be set for the change.

Figure 27:
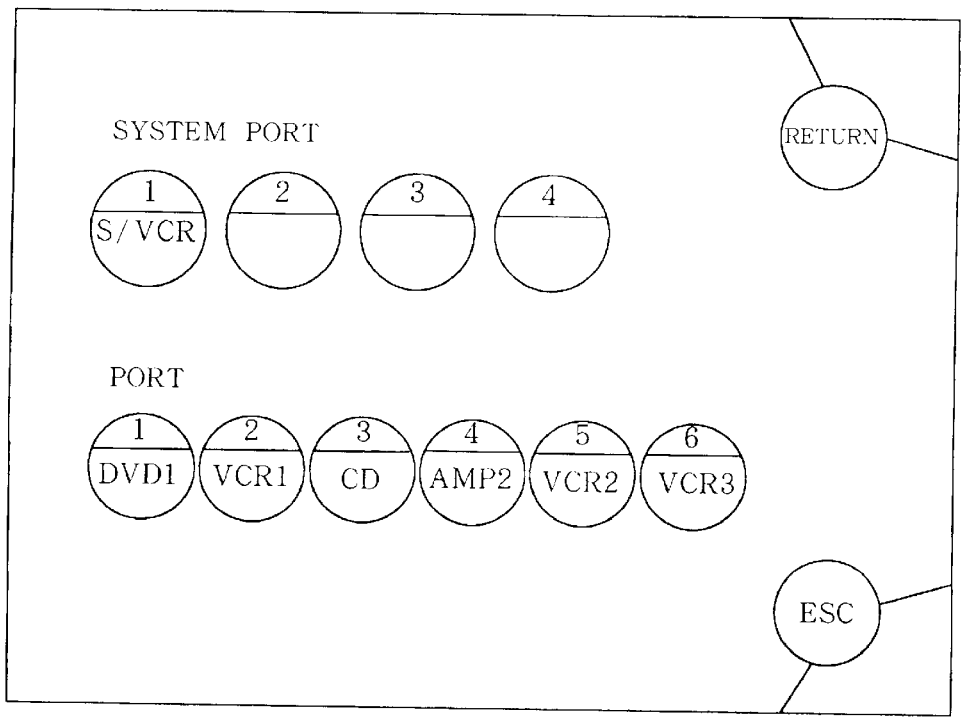
FIG. 27 is a diagram showing a maker code setting frame.
Figure 28:
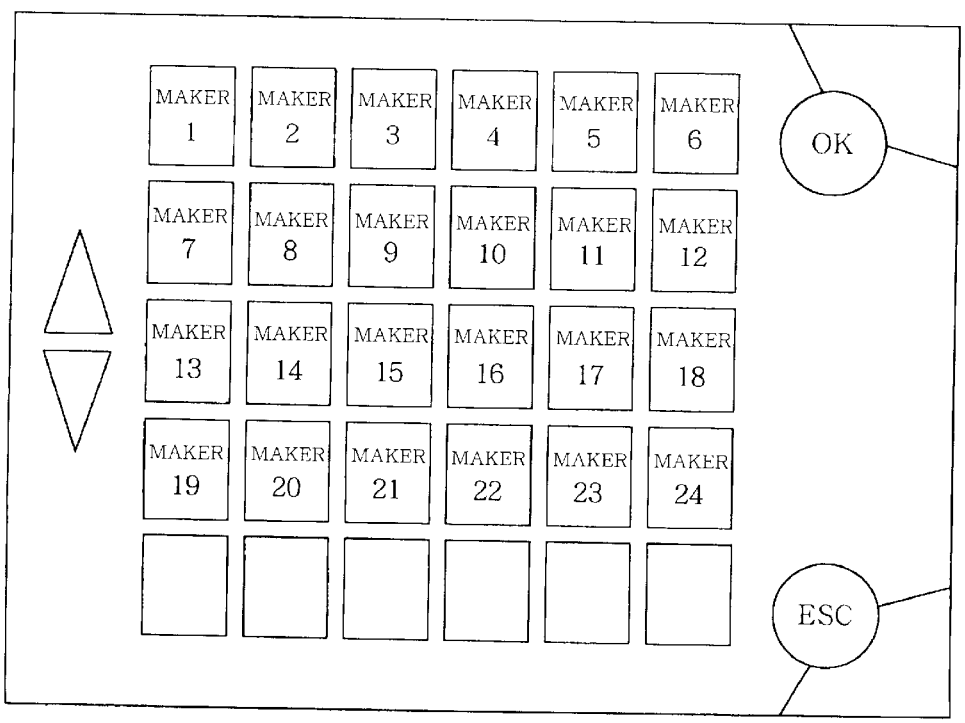
FIG. 28 is a diagram showing a maker name frame.
Figure 29:
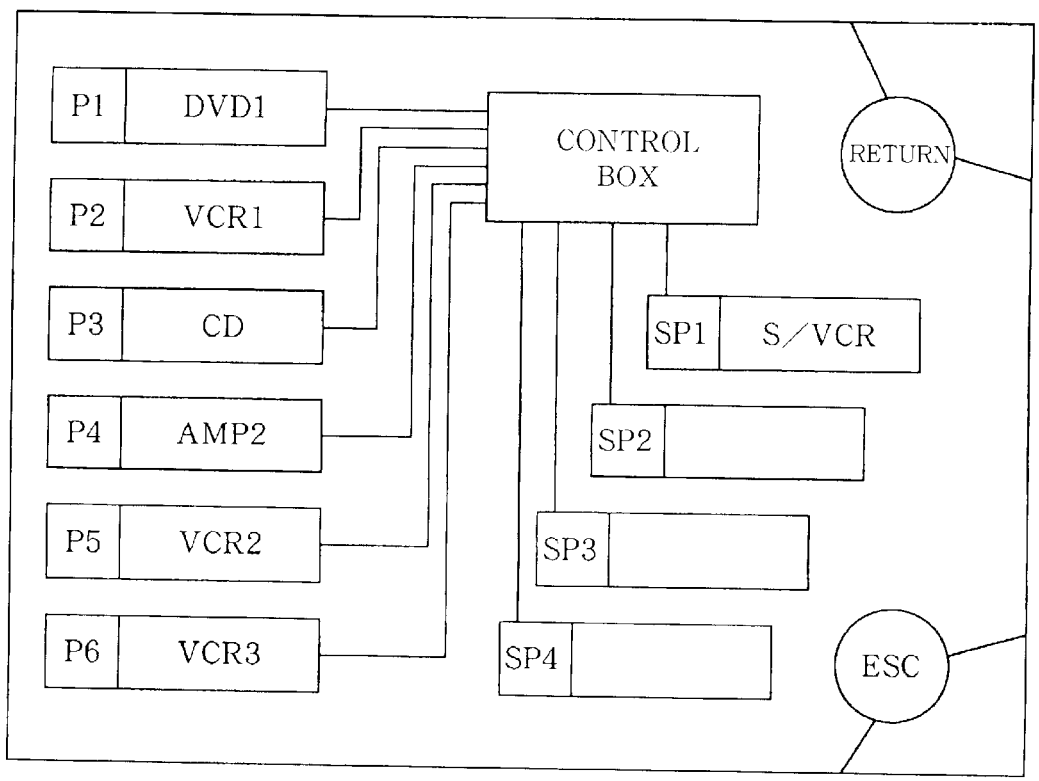
FIG. 29 is a diagram showing a connection diagnosis frame.

When a "maker code setting frame" button is manipulated on the top frame shown in FIG. 2, a maker code setting frame showing the names of the devices connected to the system port and remote control ports is displayed as seen in FIG. 27. When the port button representing the device maker to be changed is manipulated on the frame, a plurality of maker names are displayed in connection with the device indicated by the port button as shown in FIG. 28, Accordingly, the desired maker name is selected from among the displayed names, whereupon the maker code for the device concerned is changed, enabling the controller 1 to control the device of the new maker.

Self-Diagnosis Function

The AV control system of the invention is adapted to diagnose the state of connection of the devices to the controller 1. When a "connection diagnosis frame" button is manipulated on the top frame shown in FIG. 2, the connection between the controller 1 and each AV device is automatically checked for fault, and the result of diagnosis is graphically displayed on a connection diagnosis frame showing the system of connection between the controller 1 and the AV devices, enabling the user to take measures against a faulty connection if any.

The system of the present invention is not limited to the foregoing embodiment in construction but can be modified variously by one skilled in the art without departing from the spirit of the invention set forth in the appended claims.

What is claimed is:

1. An audio-video control system comprising a controller having connected thereto a plurality of devices including audio-video devices, the controller comprising an image display screen and an input unit enabling the user to perform input manipulation on the image display screen for controlling the operation of the plurality of devices in accordance with the manipulation of the input unit, the audio-video control system being characterized in that the controller comprises:

a plurality of control ports for outputting control signals to the plurality of devices, connection table storing means having stored therein a connection table prescribing connection relations between the control ports and the devices with each device having a unique name and being associated with a unique identifier, each unique identifier being associated with a respective one of the plurality of control ports, means for prescribing the control port for feeding the control signal to each device with reference to the connection table stored in the table storing means, means for displaying the connection relations between the control ports and the devices on the screen with reference to the connection table stored in the table storing means, the displayed connection relations showing the unique name of each device and the associated unique identifier of each device, means for modifying the connection relation displayed on the screen in accordance with manipulation of the input unit by removing the unique name of one device and substituting another unique name for another device; and means for rewriting the connection table based on the result of the modification such that connection table is rewritten to provide that the unique name for the another device is now associated with the unique identifier of the removed unique name.

2. An audio-video control system according to claim 1 wherein the connection relation modifying means comprises:

device name storing means having stored therein the names of a plurality of devices connectable to the controller, means for displaying the device means stored in the name storing means on the screen in accordance with manipulation of the input unit, and device name changing means for selecting one of the connection relations displayed on the screen and changing the name of the device involved in the selected connection relation for the device name as selected from the device names displayed on the screen upon the selection of the device name.

3. An audio-video controller system comprising a controller having connected thereto a plurality of devices including audio-video devices, the controller comprising an image display screen and an input unit enabling the user to perform input manipulation on the image display screen for controlling the operation of the plurality of devices in accordance with the manipulation of the input unit, the audio-video control system being characterized in that the controller comprises:

input ports to be connected to signal output devices included in the plurality of devices, output ports to be connected to signal input devices included in the plurality of devices for receiving signals from the signal output devices, connection table storing means having stored therein a connection table prescribing connection relations between the ports and the devices, each one of the devices being associated with a unique name and a unique identifier, each unique identifier being associated with a respective one of the input and output ports, port prescribing means prescribing the input port for receiving the signal from each signal output device and prescribing the output port for feeding a signal to each signal input device, with reference to the connection table stored in the table storing means, means for displaying the connection relations between the ports and the devices on the screen with reference to the connection table stored in the table storing means, the displayed connection relations showing each device and the associated unique identifier of each device, means for modifying the connection relation displayed on the screen in accordance with manipulation of the input unit by removing the unique name of one device and substituting another unique name for another device; and means for rewriting the connection table based on the result of the modification such that the rewritten connection table now provides that the unique name for the another device is now associated with the unique identifier of the removed unique name.

4. An audio-video control system according to claim 3 wherein the connection relation modifying means comprises:

device name storing means having stored therein the names of a plurality of devices connectable to the controller, means for displaying the device means stored in the name storing means on the screen in accordance with manipulation of the input unit, and device name changing means for selecting one of the connection relations displayed on the screen and changing the name of the device involved in the selected connection relation for the device name as selected from the device names displayed on the screen upon the selection of the device name.

5. A controller for an audio-video control system having connected thereto a plurality of devices including audio-video devices, comprising:

a plurality of control ports for outputting control signals to the plurality of connected devices with each control port having a unique identifier associated therewith;

an image display screen having a first region including first names of each one of the plurality of connected devices operably connected to the controller and the unique identifier associated with each one of the first names of the connected devices identifying the control port to which each respective one of the plurality of connected devices is connected and a second region different from the first region including the plurality of first names for each one of the plurality of operative devices operably connected to the controller and a plurality of second names for a plurality of other devices not connected to the controller, the plurality of second names being different from the plurality of first names; and means for naming the devices when one of the plurality of connected devices having a first name is disconnected from the controller and, as a substitute therefor, one of the plurality of the other devices having a second name is connected to the controller, the means for naming the devices is operative to move the second name of the other device which in now connected to a selected control port from the second region and into the first region and associating the identifier of the previously-connected device with the now-connected other device.

* * * * *